Patented Mar. 4, 1952

2,588,250

UNITED STATES PATENT OFFICE 2,588,250

SUPEROPAQUE ENAMEL

Bernard Kopelman, Brooklyn, and Eugene Wainer, Niagara Falls, N. Y., assignors, by mesne assignments, to National Lead Company, New York, N. Y., a corporation of New Jersey No Drawing. Application May 1, 1946, Serial No. 666,528

2 Claims. (Cl. 106—48)

The present invention relates to compositions suitable for the manufacture of porcelain or vitreous enamels suitable for use as protective coatings for sheet steel and particularly to compositions capable of producing so-called superopaque enamels of the acid-resistant type. The enamels of the present invention comprise glasses which contain phosphorous pentoxide and titania in regulated proportions whereby the desirable high opacity and acid resistance are developed.

Vitreous coatings are attached to sheet steel or iron as a protective coating and such coatings must not only be fixed to the metal base with sufficient adhesion to withstand shocks incident to the use of which the article normally encounters but more importantly must possess an ability to bend with the metal base without cracking. This desirable feature is aided by having the enamel in as thin a coating as possible consistent with the production of sufficient opacity to hide the metal base and to produce the pleasing appearance due to opacity surface finish and gloss demanded of an enamel.

In the enamelling trade, those enamels which possess a relatively high diffuse reflectance or opacity, namely, a reflectance of at least 65 units as determined upon a Hunter reflectometer at an application rate of 40 grams per square foot have been designated as superopaque enamels. At this rate of application the enamel has an approximate thinness of 7 mils. The superopaque enamels are generally prepared from frits which initially contain materials producing the desired opacity as contrasted with the use of opacifiers added to the mill during the grinding of the frit from which the enamel is made.

In addition to opacity in an enamel, it is highly desirable that the enamel possess an inherent resistance to attack by the usual fruit acids. This property is normally determined by subjecting the enamel to the action of a relatively dilute solution of either citric or lactric acid. In general, if an enamel is not etched appreciably upon contact with a 10% solution of citric acid for instance, the enamel is said to be acid resistant.

Although superopaque enamels by reason of their relatively high opacity and the possibility of use at a low application rate are highly desirable, enamels of this type as prepared heretofore have not been of the acid resistant type since they etch or stain within a few minutes when subjected to the action of fruit acids.

It is an object of the present invention to provide compositions suitable for the production of superopaque vitreous enamels which possess relatively high resistance to the action of fruit acids. In accordance with the present invention an enamel frit is prepared which contains relatively significant amounts of both titania $TiO_2$ and phosphorous pentoxide $P_2O_5$. It appears that these ingredients cooperate in some fashion to impart both the desirable property of superopacity as well as the high acid resistance. Where the phosphorous pentoxide and titania are used in proper amounts together with other glass-forming ingredients a rather clear fluid glass is produced which upon fritting in the usual way will, after milling and application to a metal base at a relatively low rate, develop high opacity during the enamelling cycle.

With the compositions of the present invention it is possible to develop a diffuse reflectance reading on the Hunter reflectometer of 70 or over, at an application rate of 12 grams per square foot corresponding roughly to an enamel thickness of about two mils. These enamels, therefore, possess sufficient opacity to be acceptable at this application and they may, furthermore, be classed as serviceably acid resistant. This feature of exceptionally high opacity combined with acid resistance are features novel in the porcelain enamel industry, keeping in mind that the opacity is present in the frit and is developed in the enamelling cycle without the necessity of using mill addition opacifiers.

In addition to the titania and phosphorous pentoxide, the enamel composition also contains alkali metal oxide, boric oxide, silica, alumina, zinc oxide and fluorides such as sodium aluminum fluoride. The composition may also contain other ingredients as, for instance, barium oxide. These constituents of a glass are supplied by employing raw materials commonly used in the ceramic industry such as soda ash, boric acid, borax, feldspar, aluminum hydrate, pyrophyllite, cryolite, barium carbonate, bone ash, phosphate rock, quartz, feldspar, kaolin, sodium metaphosphate, sodium nitrate, ammonium acid phosphate, titania, zinc oxide, etc., the choice of materials being dictated by such factors as availability and economic conditions. With the exception of the fluorides, these raw materials are substances which decompose into their respective oxides when smelted in combination to form a glass. The combined weights of alkali metal oxide, boric oxide and titanium dioxide when combined in substantially equal parts, is not more than 30% by weight of the composition. The $Al_2O_3:ZnO$ ratio ranges from 1:1 to 2:1.

The finished composition will preferably be composed of the following ingredients within the indicated range expressed as per cent by weight:

| Ingredients | Per Cent by Weight |
| --- | --- |
| $Na_2O$ | 7-11 |
| $B_2O_3$ | 5-11 |
| $SiO_2$ | 35-55 |
| $Al_2O_3$ | 3-9 |
| $TiO_2$ | 8-14 |
| ZnO | 2-6 |
| $P_2O_5$ | 2-15 |
| $Na_3AlF_6$ | 7-11 |
| BaO | 0-1 |

The following specific example is given merely as illustrative of the invention and is not to be deemed limitative thereof since it will be understood by those skilled in the art that there are many possible variations of composition provided only that they fall within the limits of the ingredients specified above.

A raw batch was made up by employing 7.9 parts of cryolite, 10.65 parts titanium dioxide, 5.3 parts zinc oxide, 27.29 parts pyrophyllite, 33.19 parts quartz, 7.18 parts sodium metaphosphate, 2.96 parts sodium nitrate and 29.10 parts borax.

The raw material is charged into a crucible pot or enamel smelting furnace which has first been brought up to temperature within the smelting range 2100° F. to 2250° F. The smelting operation is normally continued until the molten glass is clear and fluid, that is, until the batch ingredients have reacted to form a clear solution. This usually requires 30 minutes to an hour. The signal advantage of $P_2O_5$ is partly evident in this smelting stage. The enamel without $P_2O_5$ is viscous in the smelt and the $TiO_2$ tends to ball up to form insoluble greenish-blue lumps. In the presence of $P_2O_5$ the glass is much more fluid and the lumps are easily dispersed and dissolved. The solution of this heretofore insoluble $TiO_2$ accounts, at least in part, for the increase in acid resistance and opacity obtainable by this new and useful addition to titanium-containing enamels.

After the smelting period the melt is withdrawn from the furnace and fritted in the usual way by pouring the melt into water. The fritted glass is then milled in a suitable ball mill until the desired fineness is obtained. For each 100 parts of frit there should be added to the mill 40 to 45 parts of water and about 0.5 parts of montmorillonite or bentonite clay as a suspending agent. In lieu of the latter, ceramic clays up to about 5% may be employed but it is preferred that the montmorillonite or bentonite be used for this purpose. The milling should be continued until the fineness of the glass is within the range 15% on a 200 mesh screen to completely through a 325 mesh screen. A good average fineness acceptable for general work will be such that the product passes completely through a 200 mesh screen.

The milled enamels are then sprayed upon ground coated steel sheets and fired for 2½ to 3 minutes at 1520° F. The original frit which was relatively clear to opalescent develops opacity during the enamelling cycle to produce high opaque vitreous coatings which possess high gloss, smooth surfaces which are resistant to the action of fruit acids as exemplified by 10% citric acid solution.

The glass produced from the above batch possessed a calculated oxide content as follows:

| | |
| --- | --- |
| $SiO_2$ | 48.10 |
| $P_2O_5$ | 4.57 |
| $Na_2O$ | 7.31 |
| $TiO_2$ | 9.73 |
| ZnO | 4.84 |
| $Al_2O_3$ | 5.98 |
| $Na_3AlF_6$ | 9.86 |
| BaO | -- |
| $B_2O_3$ | 9.61 |

In Table I below there is set forth a series of raw batch compositions falling within the confines of the present invention while in Table II there is set forth the calculated oxide content of the corresponding frits and, in Table III, the reflectance as determined by the Hunter reflectometer is given together with the application rate expressed in grams per square foot.

*Table I*

| Batch No. | Cryolite | Barium Carbonate | Titanium Dioxide | Zinc Oxide | Pyrophyllite | Quartz | Sodium Meta-Phosphate | Sodium Nitrate | Borax | Ammonium Acid Phosphate |
| --- | --- | --- | --- | --- | --- | --- | --- | --- | --- | --- |
| 1 | 7.9 | 1.3 | 10.65 | 5.3 | 27.29 | 38.19 | 7.18 | 16.17 | 15.44 | |
| 2 | 7.9 | 1.3 | 10.65 | 5.3 | 27.29 | 33.19 | 7.18 | 10.08 | 29.10 | |
| 3 | 7.9 | 1.3 | 10.65 | 5.3 | 27.29 | 28.19 | 14.36 | 4.10 | 29.10 | |
| 4 | 7.9 | 1.3 | 10.65 | 5.3 | 27.29 | 23.19 | 19.28 | | 29.10 | 2.56 |
| 5 | 7.9 | 1.3 | 10.65 | 5.3 | 27.29 | 38.19 | 3.59 | 15.92 | 22.68 | |
| 6 | 7.9 | 1.3 | 10.65 | 5.3 | 27.29 | 35.69 | 3.59 | 13.10 | 29.10 | |
| 7 | 7.9 | 1.3 | 10.65 | 5.3 | 27.29 | 30.69 | 10.77 | 7.10 | 29.10 | |
| 8 | 7.9 | 1.3 | 10.65 | 5.3 | 14.29 | 42.13 | 11.49 | 4.85 | 29.10 | |
| 9 | 7.9 | 1.3 | 10.65 | 2.3 | 27.29 | 33.19 | 11.49 | 4.85 | 28.10 | |
| 10 | 7.9 | | 10.65 | 5.3 | 27.29 | 33.19 | 7.18 | 2.96 | 29.10 | |

*Table II*

| Batch No. | $SiO_2$ | $P_2O_5$ | $Na_2O$ | $TiO_2$ | ZnO | $Al_2O_3$ | $Na_3AlF_6$ | BaO | $B_2O_3$ |
| --- | --- | --- | --- | --- | --- | --- | --- | --- | --- |
| 1 | 52.30 | 4.53 | 9.61 | 9.65 | 4.80 | 5.94 | 7.16 | 0.91 | 5.10 |
| 2 | 47.80 | 4.53 | 9.61 | 9.65 | 4.80 | 5.94 | 7.16 | 0.91 | 9.60 |
| 3 | 43.20 | 9.06 | 9.61 | 9.65 | 4.80 | 5.94 | 7.16 | 0.91 | 9.67 |
| 4 | 38.70 | 13.59 | 9.61 | 9.65 | 4.80 | 5.94 | 7.16 | 0.91 | 9.64 |
| 5 | 52.30 | 2.27 | 9.61 | 9.65 | 4.80 | 5.94 | 7.16 | 0.91 | 7.36 |
| 6 | 50.00 | 2.27 | 9.61 | 9.65 | 4.80 | 5.94 | 7.16 | 0.91 | 9.66 |
| 7 | 45.50 | 6.80 | 9.61 | 9.65 | 4.80 | 5.94 | 7.16 | 0.91 | 9.63 |
| 8 | 47.80 | 7.25 | 9.61 | 9.65 | 4.80 | 3.22 | 7.16 | 0.91 | 9.60 |
| 9 | 47.80 | 7.25 | 9.61 | 9.65 | 2.08 | 5.94 | 7.16 | 0.91 | 9.60 |
| 10 | 48.10 | 4.57 | 7.31 | 9.73 | 4.84 | 5.98 | 9.86 | | 9.61 |

*Table III*

| Batch No. | Application, grams sq. ft. | Reflectance |
|---|---|---|
| 1 | 12.6 | 62.0 |
| 2 | 12.0 | 71.0 |
| 3 | 12.6 | 70.5 |
| 4 | 13.2 | 68.1 |
| 5 | 11.4 | 59.4 |
| 6 | 12.0 | 70.4 |
| 7 | 12.0 | 71.5 |
| 8 | 12.0 | 70.6 |
| 9 | 11.4 | 65.0 |
| 10 | 12.0 | 71.8 |

What is claimed is:

1. A frit composition suitable for use in the manufacture of superopaque enamels consisting essentially of 7% to 11% sodium oxide, 5% to 11% boric oxide, 35% to 55% silicon dioxide, 3% to 9% aluminum oxide, 2% to 6% zinc oxide, 7% to 11% sodium aluminum fluoride, 8% to 14% titanium dioxide and 2% to 15% phosphorous pentoxide.

2. A frit composition suitable for use in the manufacture of superopaque enamels consisting substantially of 7% to 11% sodium oxide, 5% to 11% boric oxide, 35% to 55% silicon dioxide, 3% to 9% aluminum oxide, 2% to 6% zinc oxide, 7% to 11% sodium aluminum fluoride, 8% to 14% titanium dioxide and 2% to 15% phosphorous pentoxide, the proportions by weight of the oxides of sodium, boron and titanium being not more than 30% of said composition.

BERNARD KOPELMAN.
EUGENE WAINER.

REFERENCES CITED

The following references are of record in the file of this patent:

UNITED STATES PATENTS

| Number | Name | Date |
|---|---|---|
| 2,339,260 | Frost et al. | Jan. 18, 1944 |
| 2,347,187 | Frost | Apr. 25, 1944 |
| 2,370,695 | Stufft | Mar. 6, 1945 |